J. A. EBERLE.
GRASS CATCHER.
APPLICATION FILED AUG. 27, 1910.
1,002,660.
Patented Sept. 5, 1911.
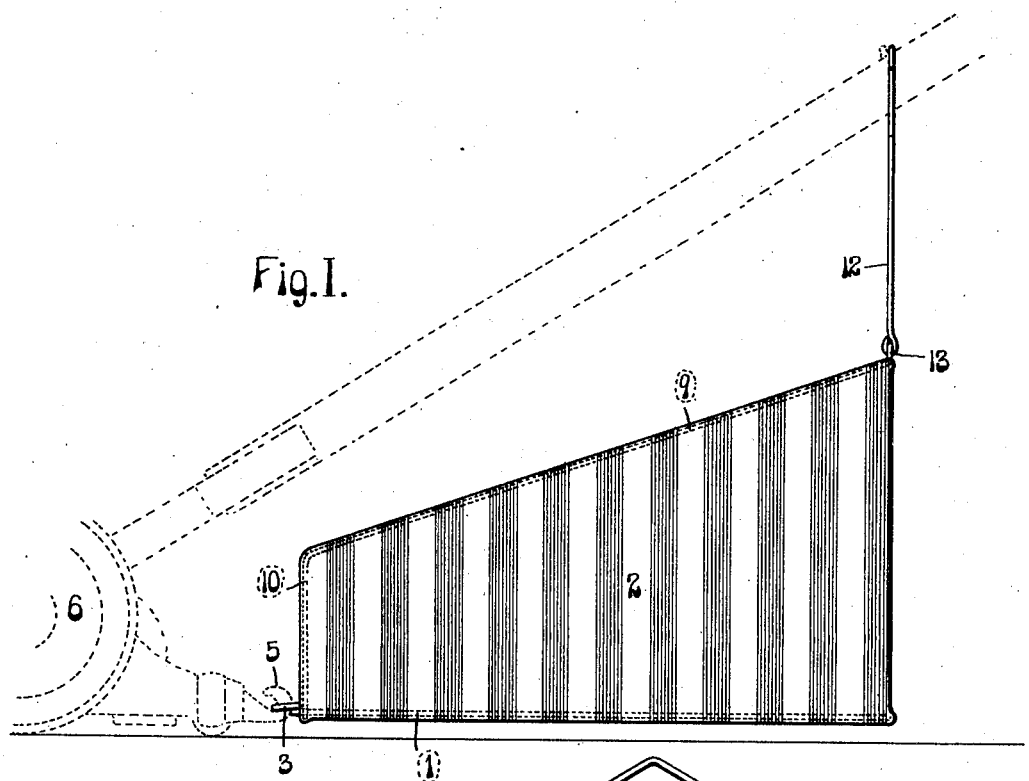
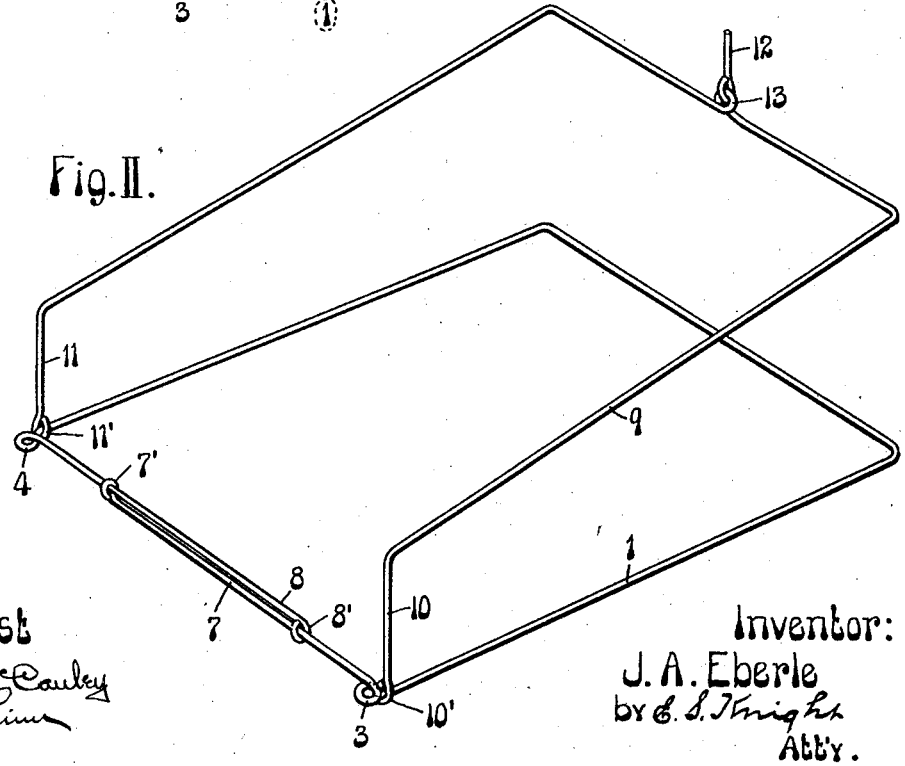
Attest
A. J. McCauley
E. B. Linn
Inventor:
J. A. Eberle
by E. S. Knight
Att'y.

UNITED STATES PATENT OFFICE.

JOHN A. EBERLE, OF ST. LOUIS, MISSOURI, ASSIGNOR TO THE PERFECTION MANUFACTURING COMPANY, OF ST. LOUIS, MISSOURI, A CORPORATION.

GRASS-CATCHER.

1,002,660.  Specification of Letters Patent.  Patented Sept. 5, 1911.

Application filed August 27, 1910. Serial No. 579,216.

*To all whom it may concern:*

Be it known that I, JOHN A. EBERLE, a citizen of the United States of America, residing in the city of St. Louis and State of Missouri, have invented certain new and useful Improvements in Grass-Catchers, of which the following is a full, clear, and exact description, reference being had to the accompanying drawings, forming part of this specification.

My invention relates to an improvement in grass catchers, and has for its object to provide a simple and efficient catcher which may be adjusted to varying widths of lawn mowers and held thereto without the use of springs.

Figure I is a side elevation of my grass catcher attached to a lawn mower shown in dotted line. Fig. II is a perspective view of the skeleton framework of my catcher.

In the accompanying drawings: 1 designates the lower frame section of my grass catcher to which a body 2 of a fabric forming the walls and bottom of the grass catcher is secured.

The lower frame section 1 is made of wire and comprises a rear cross bar and side bars, the latter of which terminate at their front ends in eyes 3 and 4 produced by bending the side bars of which the frame section is made into circles and positioning continuations of such wire, extending from the front ends of the side bars, at right angles to the side bars of the lower frame section and parallel with the rear cross bar of said section. The eyes 3 and 4 thus produced are horizontally disposed at the front corners of the lower frame section and are adapted to receive hooks 5 attached to a lawn mower 6 shown in dotted lines and arranged in upright positions thereon so that when they are fitted to the catcher, they will act to hold said catcher from lateral movement.

The transverse continuations of the lower frame section 1 extending from the eyes 3 and 4 constitute overlapping front bars 7 and 8 arranged parallel with each other, and each of which terminates at its end in an eye that surrounds the other front bar. The eye at the termination of the front bar 7 is designated 7', while that at the end of the front bar 8 is designated 8'. The front bars 7 and 8 are adapted to support the front end of the bottom of the fabric 2 which is loosely arranged on said front bars, in order that the front bars may partake of sliding movement relative to each other in the spreading and contraction of the lower frame section for the proper spacing of the hook receiving eyes 3 and 4 according to the widths of lawn mowers in connection with which the grass catcher is to be used. The sliding engagement between the front bars 7 and 8 furnished by the eye carried by each front bar and encircling the other front bar provides for the two front bars being at all times retained in proper relation, and this engagement furthermore provides for each front bar acting to reinforce the other front bar in the resistance of strain that may be imposed upon it.

9 is an upper frame section made of wire and comprising a rear cross bar and side bars having downwardly bent front bars 10 and 11 terminating in eyes 10' and 11' receiving the side bars of the lower frame section 1, for the purpose of providing a hinged joint between the upper and lower frame sections.

12 is a hanger secured to an eye 13 in the rear bar of the upper frame section and adapted to have its upper end hooked over the handle of the lawn mower for the purpose of sustaining the rear end of the grass catcher.

It will be noted that by providing the hinged joint between the upper and lower frame sections the catcher can be compactly folded and packed to occupy but a minimum amount of space.

To make the adjustability of the width of the catcher possible, the body 2 of fabric is made wide enough at the front end of the catcher to admit of the extreme width of adjustability, and when a lesser width is desired, the fabric simply folds in gathers along the transverse front bars of the lower frame section.

I claim:

1. A grass catcher having a lower frame section comprising a rear cross bar, side bars and front bars carried by said side bars arranged parallel with each other, each of said front bars having integral therewith an eye in which the other front bar is slidable, an upper frame section connected to the lower frame section, and a body attached to said frame sections.

2. A grass catcher having a lower frame section comprising a rear cross bar, side bars and front bars carried by said side bars arranged parallel with each other and each provided with an eye in which the other bar is slidable, the said lower frame section being provided at the junction of said side bars and front bars with horizontal eyes for the reception of attaching hooks carried by a lawn mower.

3. A grass catcher having a lower frame section comprising a rear cross bar, side bars and front bars carried by said side bars arranged parallel with each other and each provided with an eye in which the other bar is slidable, the said lower frame section being provided at the junction of said side bars and front bars with horizontal eyes for the reception of attaching hooks carried by a lawn mower, an upper frame section connected to the lower frame section and having a rear cross bar formed with an eye, a hanger engaging the eye of the rear cross bar, and a body attached to said sections.

JOHN A. EBERLE.

In the presence of—
M. C. HAMMON,
E. B. LINN.

---

Copies of this patent may be obtained for five cents each, by addressing the "Commissioner of Patents, Washington, D. C."